US007613843B1

(12) United States Patent
Dhandapani et al.

(10) Patent No.: US 7,613,843 B1
(45) Date of Patent: Nov. 3, 2009

(54) ACTIVITY INDICATOR FOR MASS STORAGE DEVICE

(75) Inventors: Kayalvizhi Dhandapani, Norcross, GA (US); Shibu Abraham, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 252 days.

(21) Appl. No.: 11/332,448

(22) Filed: Jan. 13, 2006

(51) Int. Cl.
*G06F 3/00* (2006.01)
*G06F 13/00* (2006.01)
(52) U.S. Cl. .............................. 710/8; 710/15; 710/18
(58) Field of Classification Search .................. None
See application file for complete search history.

(56) References Cited

U.S. PATENT DOCUMENTS

2003/0197676 A1* 10/2003 Smith ....................... 345/156

* cited by examiner

*Primary Examiner*—Tariq R. Hafiz
*Assistant Examiner*—Scott Sun
(74) *Attorney, Agent, or Firm*—Hope Baldauff Hartman, LLC (57) ABSTRACT

An activity indicator for a mass storage device is provided. Enclosure management data is received for a mass storage device from a HBA. The enclosure management data is decoded to determine whether the enclosure management data indicates that the mass storage device is active. A drive activity signal is received from the mass storage device and analyzed to determine whether the signal indicates that the mass storage device is active. If either the enclosure management data or the drive activity signal indicates that the mass storage device is active, the drive activity indicator is provided.

18 Claims, 6 Drawing Sheets

ACTIVITY INDICATOR FOR MASS STORAGE DEVICE

TECHNICAL FIELD

The present invention is related to the management of data storage device enclosures. More particularly, the present invention is related to providing an activity indicator for mass storage devices connected to an enclosure management device.

BACKGROUND

In large scale computing systems, it is often necessary to provide an operator with detailed information regarding the presence and status of mass storage devices. In order to provide such functionality, many storage solutions utilize a backplane with an integrated enclosure management device, referred to herein as an "enclosure management backplane." In addition to performing other functions, an enclosure management backplane provides facilities for generating visual indicators based upon enclosure management data received from a connected host bus adapter ("HBA"). For instance, in some solutions, individual light-emitting diodes ("LEDs") may be driven by an enclosure management backplane for displaying information regarding the activity, failure, rebuild status, and other information for each of the mass storage devices connected to the enclosure management backplane.

In order to provide these indicators, and other types of functionality, an enclosure management backplane typically provides connections for multiple mass storage devices, such as hard disk drives. The backplane also interfaces with an HBA and provides an interface through which the HBA may communicate with the mass storage devices. An enclosure management backplane also may receive and transmit enclosure management data to and from the HBA. Enclosure management data is any data relating to the provision of enclosure management services by a backplane.

Several different physical interfaces may be utilized to deliver enclosure management data between a HBA and an enclosure management backplane. For instance, some Serial Attached SCSI ("SAS")-compatible HBAs are equipped with a serial general purpose input/output interface ("SGPIO"). Some Serial Advanced Technology Attachment ("SATA")-compatible HBAs, on the other hand, utilize a control or management bus, such as the I²C bus from PHILIPS SEMICONDUCTORS, to exchange enclosure management data between the enclosure management backplane and the HBA. Some vendors have even implemented an enclosure management protocol based on the I²C bus for SAS HBAs.

The particular protocol utilized to transfer enclosure management data between the enclosure management backplane and the HBA may also vary from solution to solution. For instance, the Small Computer Systems Interface ("SCSI") Accessed Fault-Tolerant Enclosures Interface Specification ("SAF-TE") is typically utilized with SATA HBAs utilizing the I²C management bus. Alternatively, the SGPIO protocol may be utilized with a SAS HBA utilizing an SGPIO interface to exchange enclosure management information between a HBA and an enclosure management backplane. Other protocols, such as SCSI Enclosure Services-2 ("SES-2"), may also be utilized.

Most Integrated Drive Electronics ("IDE") and SCSI mass storage devices are capable of driving an activity indicator directly. For instance, a light emitting diode ("LED") may be connected directly to an activity signal provided by the device that is illuminated when the device is active. However, most SATA mass storage devices cannot drive an activity indicator directly.

Enclosure management protocols (e.g. SES-2, SGPIO, and SAF-TE) may also include data regarding the activity of the device. The drive activity information must be decoded by the enclosure management backplane to drive an activity indicator. Optionally, SATA devices may provide an activity indication through a pin on their interface (pin "P11"). Many SATA devices do not provide an activity signal on pin P11, however. All SAS devices provide activity information on a pin on their drive interface (pin P11). The signal provided is high when the drive is not connected and goes low when the drive is identified by the HBA. The signal toggles during drive activity. The enclosure management protocol utilized with SAS devices can also provide activity information for these types of mass storage devices.

Because some types of devices directly provide an activity indicator signal while others do not, it is difficult to provide an enclosure management backplane that supports drive activity indicators for different types of devices, such as SATA and SAS devices. It is with respect to these considerations and others that the present invention has been made.

SUMMARY

In accordance with the present invention, the above and other problems are solved by a method, apparatus, integrated circuit, and computer-readable medium for providing an activity indicator for a mass storage device. According to one aspect of the invention, a drive activity indicator can be provided for a mass storage device regardless of whether the mass storage device provides its own drive activity signal.

According to one method provided by an embodiment of the invention, enclosure management data is received for a mass storage device from a HBA. The enclosure management data may be formatted according to the SAF-TE, SGPIO, or SES-2 protocols or other appropriate management protocol. The enclosure management data is decoded to determine whether the enclosure management data indicates that the mass storage device is active. A drive activity signal is also received from the mass storage device. The drive activity signal is analyzed to determine whether the signal indicates that the mass storage device is active. If either the enclosure management data or the drive activity signal indicates that the mass storage device is active, the drive activity indicator is provided.

According to other aspects of the method, the mass storage device may toggle the drive activity signal when the device is active. In order to determine whether the drive activity signal indicates that the drive is active, the drive activity signal may be periodically sampled to determine whether the signal is being toggled. The value of the drive activity signal may be sampled at a rate of at least two times the frequency of the drive activity signal. Each of the sampled values for a time period are added. A determination is then made as to whether the sum of the sampled values is equal to zero or equal to the number of samples taken during the time period. If the sum is equal to zero or the number of samples taken during the time period, then the drive activity signal is not being toggled and the drive activity indicator is not provided. If the sum is equal to any other number, the drive activity signal is being toggled and the drive activity indicator is provided at a desired frequency.

According to another aspect, the value of the drive activity signal is sampled at a rate of at least two times the frequency of the drive activity signal. Each of the samples taken during a time period are compared to determine whether any of the sampled values are different. If one or more of the values changed during the time period, then it is determined that the drive activity signal is being toggled and the drive activity indicator is provided. Providing the drive activity indictor includes providing any type of audio or visual indication that the mass storage device is active, such as driving a LED at a specified frequency. These implementations provide control over the frequency at which the LED is driven and eliminate the need for the external circuitry necessary for combining the activity signal from the mass storage device with information from the enclosure management protocol that is used in some implementations.

According to other aspects, an integrated circuit is provided for providing an activity indicator for a mass storage device. The integrated circuit includes a first input for receiving enclosure management data for a mass storage device from a HBA. The integrated circuit also includes a second input for receiving a drive activity signal generated by the mass storage device. The integrated circuit also includes a first output for generating an indication that the mass storage device is active, such as for driving a LED.

The integrated circuit also includes a processing portion for decoding the enclosure management data received on the first interface and for determining whether the enclosure management data indicates that the mass storage device is active. The processing portion is also operative to determine from the drive activity signal received on the second input whether the mass storage device is active, and to activate the first output in response to determining that the enclosure management data indicates that the mass storage device is active or the drive activity signal indicates that the mass storage device is active.

The above-described aspects of the invention may also be implemented as a computer-controlled apparatus, a computer process, a computing system, an apparatus, as an article of manufacture such as a computer program product or computer-readable medium, or as a semiconductor integrated circuit, including but not limited to a custom application specific integrated circuit, a programmable micro-controller type device, or a field-programmable gate array device. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
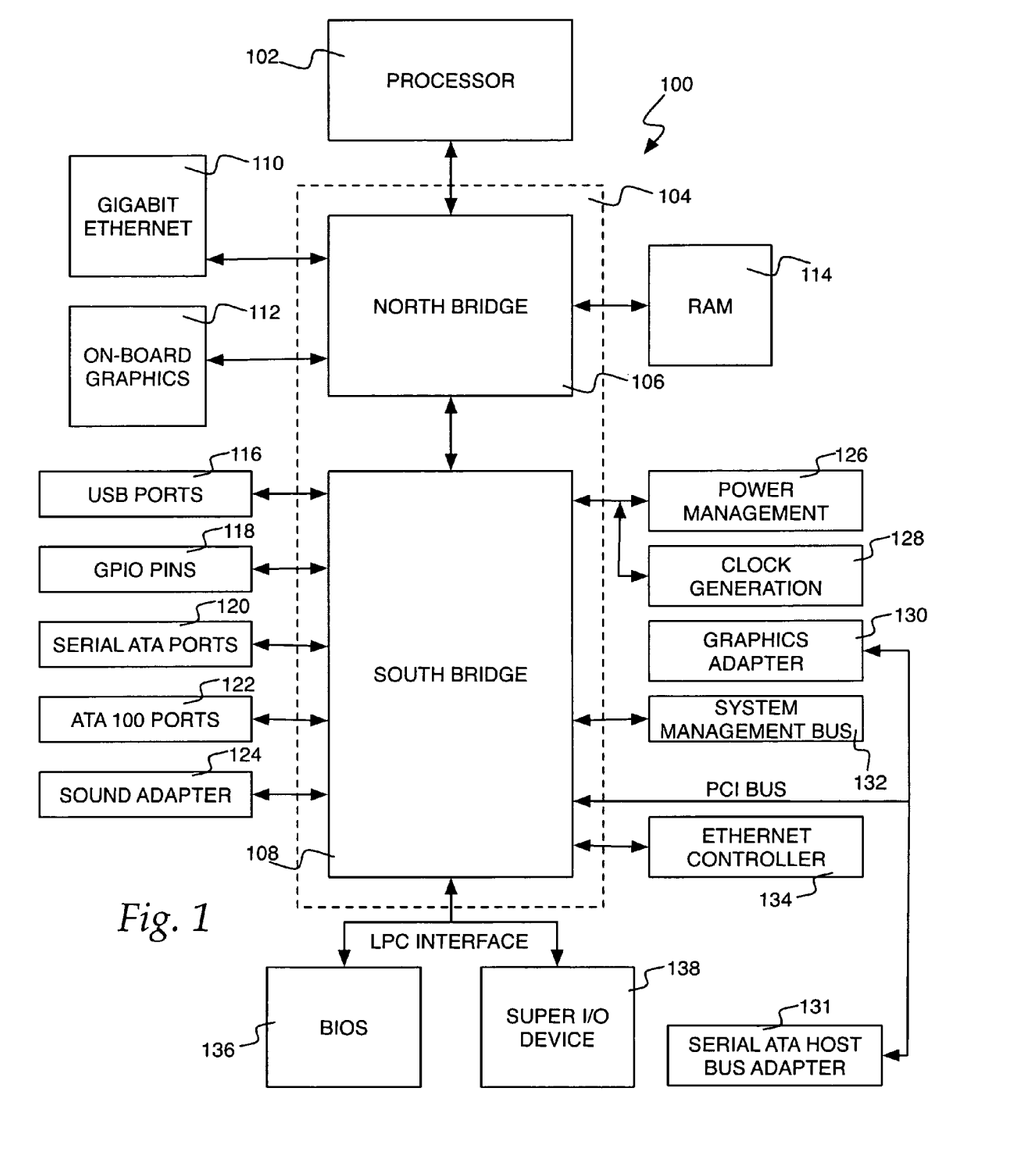
FIG. 1 is a computer architecture diagram showing aspects of a computer utilized as an illustrative operating environment for the various implementations described herein.

FIG. 1 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, details regarding an illustrative operating environment for implementations of the invention will be provided. In particular, FIG. 1 illustrates a computer architecture for practicing the embodiments of the present invention. It should be appreciated, however, that although the embodiments of the invention described herein are discussed in the context of a conventional desktop or server computer, the embodiments of the invention may be utilized with virtually any type of computing device.

As described briefly above, the embodiments of the invention described herein provide an activity indicator for a mass storage device. FIG. 1 illustrates a host computer that, as will be described in greater detail below, may utilize one or more enclosure management backplanes to interface with one or more mass storage devices and to provide an activity indicator for each of the mass storage devices. The activity indicator may comprise any type of audio or visual indicator. In one implementation of the invention, the visual indicator comprises a LED that is illuminated when the mass storage device is active. The enclosure management backplanes described herein are equipped with an integrated circuit capable of providing the activity indicator. It should be appreciated that the architecture of the computer 100 is merely illustrative and that any type of computer capable of hosting a HBA with enclosure management functionality may be utilized.

An illustrative computer architecture for practicing the various embodiments of the invention will now be described. In particular, a computer 100 is utilized that is equipped with a HBA. In order to provide this functionality, the computer 100 includes a baseboard, or "motherboard", which is a printed circuit board to which a multitude of components or devices may be connected by way of a system bus or other electrical communication path. In one illustrative embodiment, a processor ("processor" or "CPU") 102 operates in conjunction with a chipset 104. The CPU 102 is a standard central processor that performs arithmetic and logical operations necessary for the operation of the computer 100.

The chipset 104 includes a north bridge 106 and a south bridge 108. The north bridge 106 provides an interface between the CPU 102 and the remainder of the computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a system management bus 132 for use in managing the various components of the computer 100. Power management circuitry 126 and clock generation circuitry 128 may also be utilized during the operation of the south bridge 108. The south bridge 108 may also provide a bus for interfacing peripheral card devices such as a graphics adapter 130. In one embodiment, the bus comprises a peripheral component interconnect ("PCI") bus. The PCI bus may also be utilized to interface with one or more HBAs, such as the serial ATA HBA 131. As described in greater detail below, the HBA 131 may be connected to an enclosure management backplane for providing enclosure management functionality.

According to embodiments, the south bridge 108 is an enhanced south bridge operative to provide a HBA for connecting mass storage devices to the computer 100 without the use of an add-in card such as the PCI HBA 131. For instance, according to an embodiment, the south bridge 108 includes a serial advanced technology attachment ("SATA") adapter for providing one or more serial SATA ports 120 and an ATA 100 adapter for providing one or more ATA 100 ports 122. The SATA ports 120 and the ATA 100 ports 122 may be, in turn, connected directly to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user. Alternatively, the serial SATA ports 120 may be connected to an enclosure management backplane for providing enclosure management functionality.

The mass storage devices connected to the south bridge 108, and its associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing a basic input/output system ("BIOS") 136 or an extensible firmware interface ("EFI") compatible firmware that includes program code containing the basic routines that help to start up the computer 100 and to transfer information between elements within the computer 100. It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
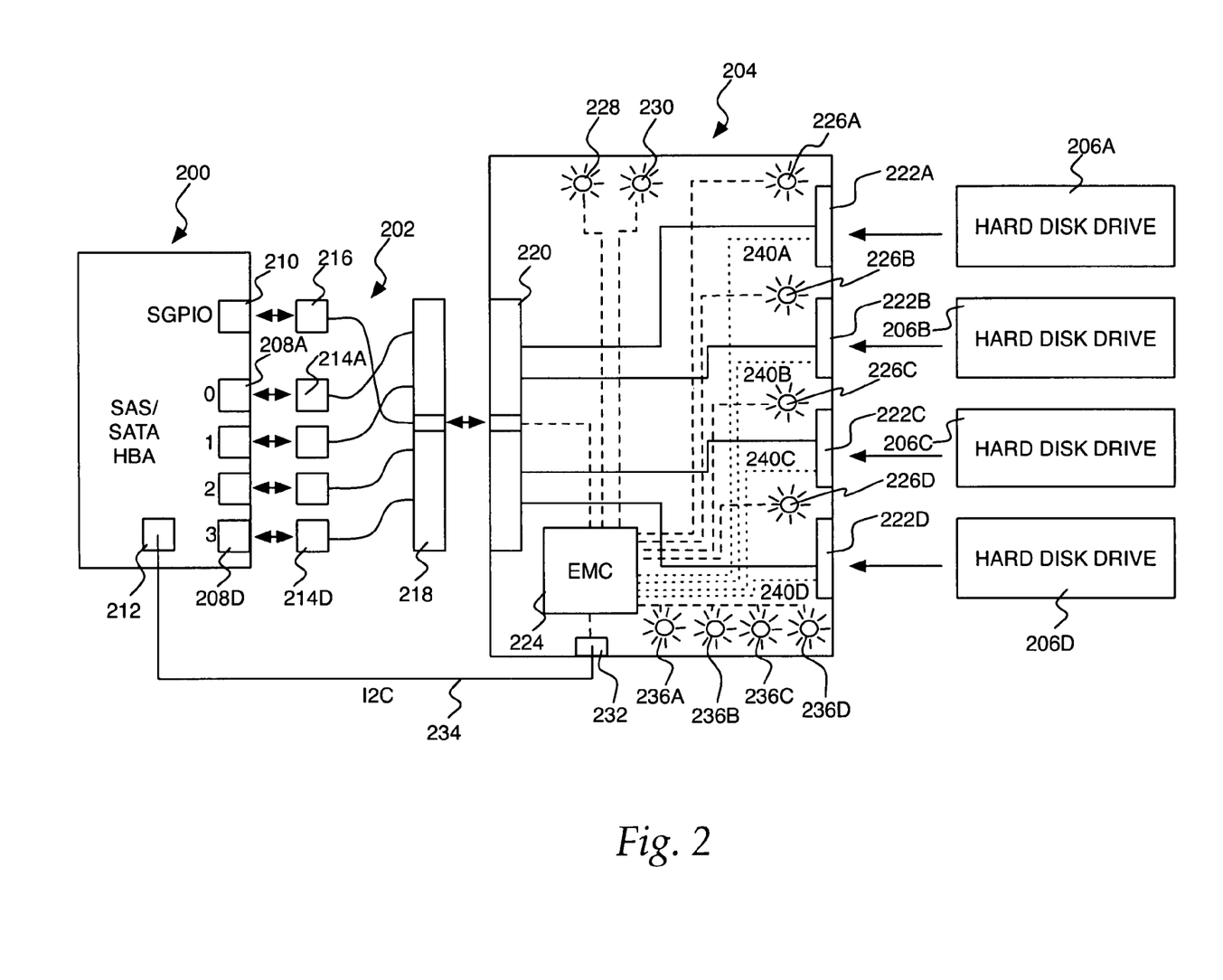
FIG. 2 is a block diagram illustrating aspects of a host bus adapter, an enclosure management controller, and an enclosure management backplane described herein.

Turning now to FIG. 2, additional details regarding one operating environment for the implementations of the invention and an enclosure management backplane 204 utilized in implementations of the invention will be described. As shown in FIG. 2, an HBA 200 having one or more ports 208A-208D is utilized. According to one implementation, the HBA 200 comprises an HBA for use with SATA mass storage devices or an HBA compatible with SAS mass storage devices. It should be appreciated that other types of HBAs compatible with other types of mass storage devices may also be utilized.

According to embodiments of the invention, different physical interfaces may be utilized by the HBA 200 to exchange enclosure management data between the HBA 200 and the enclosure management backplane 204. For instance, some SAS-compatible HBAs are equipped with an SGPIO interface, while some SATA-compatible HBAs, on the other hand, utilize a control or management bus, such as the $I^2C$ bus from PHILIPS SEMICONDUCTORS, to exchange enclosure management data between the enclosure management backplane 204 and the HBA 200. In the case of an HBA 200 equipped with SGPIO, an SGPIO port 210 is included on the HBA 200 for making an appropriate connection with the backplane 204. When the HBA 200 is equipped with an $I^2C$ bus, an appropriate $I^2C$ port 212 is made available on the HBA 200 to communicate with the enclosure management backplane 204.

It should be appreciated that the particular physical interfaces described herein for exchanging enclosure management information with the backplane are merely illustrative and that any physical communications link suitable for transmitting enclosure management data may be utilized with the various aspects of the invention. The HBA may also support multiple enclosure management interfaces and protocols, such as $I^2C$ and SGPIO both, or some custom enclosure management bus. The HBA may have a jumper or additional pins on the cable or connectors used to carry the enclosure management interface from the HBA to the backplane. These additional pins may be used to communicate to the HBA which interface should be used, in the case where there are multiple options. Additionally, the HBA may use some form of automatic or default detection mechanism, where it would send out data over the various available interfaces, and then either not receive a response on the interfaces where there is no available enclosure management device, or receive a response from a device that can acknowledge the response for the particular protocol that the HBA was sending out a query for. It is also possible that an HBA can be configured to support a particular enclosure management protocol by upgrading the firmware of the HBA, or by using host-side applications, command line utilities, or configuration monitors i.e. over a direct serial port to the HBA. This same access and configuration method could be used to change or otherwise configure specific instructions and commands that are sent to the enclosure management backplane.

As shown in FIG. 2, an appropriate cable may be utilized to connect the ports 208A-208D of the HBA 200 to the enclosure management backplane 204. In particular, individual cables may be utilized to connect the ports 208A-208D to the backplane 204. Alternatively, a multilane cable 202 may be utilized to connect the individual ports on the HBA 200 to a single multilane connector 220 on the backplane 204. It should be appreciated that the multilane cable 202 may be equipped with multilane connectors on both ends or only on one end, as shown in FIG. 2. Where the multilane cable 202 includes only one multilane connector 218, the other end may be configured with individual connectors 214A-214D compatible with the ports 208A-208D on the HBA 200. It should also be appreciated that although the HBA 200 has been illustrated as having four ports 208A-208D, HBAs with other port configurations may be utilized. For instance, an HBA having eight ports may be utilized with two backplanes configured as shown in FIG. 2. Alternatively, the backplane 204 and the enclosure management controller integrated circuit 224 may be configured for use with either or more drives. Other configurations should also be apparent.

When the HBA 200 comprises an SAS-compatible HBA and includes a SGPIO port 210, the multilane cable 202 may further include an appropriate connector 216 for connecting to the SGPIO port 210. The multilane connector 218 is also appropriately configured for passing the side-band signals from the SGPIO port 210 to an appropriate portion of the multilane connector 220 on the backplane 204. When the HBA 200 comprises a SATA-compatible HBA and includes an I²C port 212, an appropriate I²C cable 234 may be utilized for connecting to the I²C port 212 on the HBA 200 an I²C port 232 on the enclosure management backplane 204. The SGPIO signals are routed from the multilane connector 220 to an enclosure management integrated circuit ("IC") 224 on the enclosure management backplane 204 and the I²C signals are routed from the I²C connector 232 to the enclosure management IC 224 on the enclosure management backplane 204. It should be appreciated that although illustrated in FIG. 2 as having both an I²C interface and an SGPIO interface, the HBA 200 is typically equipped with only one interface for exchanging management data with the backplane 204. The backplane 204 and the enclosure management controller IC 224, however, are configured to receive enclosure management information on multiple interfaces to thereby support the use many types and configurations of HBAs.

As also shown in FIG. 2, the enclosure management backplane 204 includes ports 222A-222D for directly interfacing with one or more mass storage devices, such as the hard disk drives 206A-206D. According to embodiments of the invention, the backplane 204 may be mounted within an enclosure such that the hard disk drives 206A-206D slide directly into the enclosure and thereby mate directly with the appropriate port 222A-222D. The backplane 204 also includes circuitry for routing signals to and from the ports 222A-222D to the appropriate portions of the multilane connector 220. In this manner, the backplane 204 enables direct communication between then HBA 200 and the connected hard disk drives 206A-206D.

As discussed briefly above, the enclosure management backplane 204 provides a number of enclosure management functions. To enable this functionality, the enclosure management backplane 204 is equipped with an enclosure management IC 224. The enclosure management IC 224 is operative to receive enclosure management data from the HBA 200 on one of any number of physical interfaces, such as I²C and SGPIO, and to perform various management functions in response to receiving this data. For instance, the enclosure management IC 224 may receive data from the HBA 200 instructing it to illuminate one of the LEDs 226A-226D for locating a particular one of the hard disk drives 206A-206D. The LEDs 236A-236D may also be illuminated by the enclosure management IC 224 to indicate that one of the hard disk drives 206A-206D has failed. LEDs 228-230 may also be illuminated to provide a global indication that one of the hard disk drives 206A-206D, or a hard disk drive connected to another connected backplane, is active or has failed. The enclosure management IC 224 may also provide information to the HBA 200. For instance, data indicating whether a particular drive is mated to the backplane 204 may be provided by the enclosure management controller IC 224 to the HBA 200.

As described in greater detail below, the enclosure management IC 224 may also illuminate the LEDs 226A-226D to indicate activity on the hard disk drives 206A-206D. In order to perform this function, a drive activity signal may be routed from each of the drives 206A-206D to the enclosure management IC 224 through the connections 240A-240D, respectively. The drive activity signal is a signal provided by each of the mass storage devices that indicates when the drive is engaged in activity, such as when the drive is performing read or write operations. In one implementation, the drive activity signal comprises pin P11 on the interface connector for SATA drives. The drive activity signal may also comprise pin P11 (the "Ready LED signal") on SAS-compatible drives. Other types of mass storage devices may provide similar signals at different locations on their interface connectors. Typically, these signals are connected directly to an LED using one or more resistors, but in the implementations described herein they are connected to an input on the enclosure management IC 224. Additional details regarding the operation of the enclosure management IC 224 for providing a drive activity indicator for each of the connected mass storage devices is provided below with respect to FIGS. 3-6.

Figure 3:
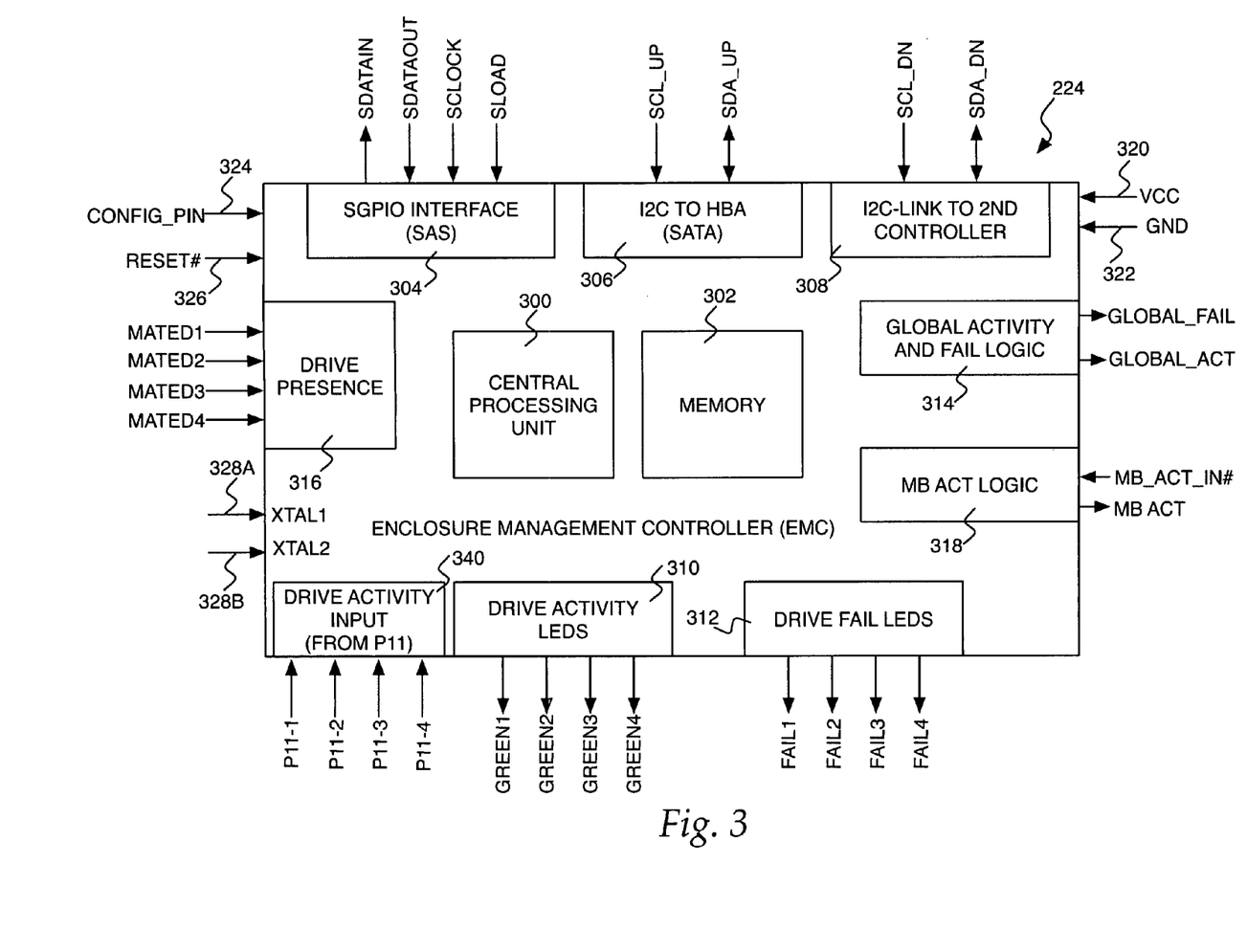
FIG. 3 is a functional block diagram illustrating aspects of an enclosure management controller semiconductor integrated circuit described herein.

Referring now to FIG. 3, a functional block diagram illustrating aspects of an enclosure management controller IC 224 provided in embodiments of the invention will be described. As shown in FIG. 3, the enclosure management IC 224 includes a CPU 300 and memory 302. The CPU 300 controls the overall operation of the IC as described herein. The memory 302 may be utilized by the CPU 300 during the performance of its processing functions. It should be appreciated that although the IC is described herein as a programmable micro-controller including a CPU 300 and memory 302, the embodiments of the invention may be implemented utilizing a general purpose computer, a custom application specific integrated circuit, a field-programmable gate array device, or any other type of IC or computing device known to those skilled in the art.

According to embodiments, the enclosure management IC 224 shown in FIG. 3 is equipped with multiple physical interfaces for communicating enclosure management data with an HBA. For instance, the IC may include an SGPIO interface 304 for communicating enclosure management data with an SAS-equipped HBA. The SGPIO interface 304 supports four signals: SDATAOUT, the serial data output bit stream from the initiator; SDATAIN, the serial output stream to the initiator; SCLOCK, the clock signal from the initiator; and SLOAD, the last clock of a bit stream from the initiator. The use of these signals is known to those skilled in the art.

According to embodiments of the invention, the enclosure management IC 224 is also equipped with an I²C interface 306 for communicating enclosure management data with a SATA HBA. The interface 306 includes two signals: SCL_UP, the serial clock line for connection to the HBA or another upstream I²C device; and SDA_UP, the serial data line for connection to the HBA or another upstream I²C device. An interface 308 may also be provided for connecting to a downstream I²C device. The interface 308 includes two signals: SCL_DN, the serial clock line for connection to a downstream I²C device; and SDA_DN, the serial data line for connection to a downstream I²C device. The interfaces 306 and 308 may be utilized to connect multiple enclosure management controller ICs, and to thereby support enclosure management functions for a large number of mass storage devices. The enclosure management controller IC 224 can also determine which of the physical interfaces 304 or 306 is connected to an HBA and being used for exchanging enclosure management data, and to selectively utilize only the active interface.

According to embodiments of the invention, the enclosure management controller IC also includes circuitry for generating output signals for driving a visual or audible indicator. For instance, an output portion 310 may be provided for driving LEDs when one or more of the connected hard disk drives are active. Similarly, an output portion 312 may be provided for driving LEDs when one or more of the connected hard disk drives has failed. It should be appreciated that a separate output is provided for driving an individual LED indicating the activity or failure of each hard disk drive. In this regard, the enclosure management controller IC 224 also includes a drive activity input 340 for receiving the drive activity signal from each of the connected devices. In an implementation, pin P11 of each of the devices is individually routed to the input 340. The use of these signals in providing a drive activity indicator is described in greater detail below with respect to FIGS. 4-6.

According to other embodiments of the invention, the enclosure management controller IC also includes circuitry 314 for driving an indicator showing global activity and global failure. It should be appreciated that these outputs may be configured to either drive an LED directly or to connect to an upstream IC. In this manner, the activity and failure or drives connected to one IC may be communicated to additional upstream ICs.

The enclosure management controller IC may also be equipped with circuitry 318 for generating a motherboard activity display. This circuitry 318 may include an input for receiving motherboard activity from a downstream IC (MB_ACT_IN#) and an output (MB_ACT) for driving an LED or communicating a motherboard activity signal to an upstream IC. The IC may also include circuitry 316 for receiving a signal from each of the hard disk drives indicating that the drive has been mated with the backplane. This information may then be communicated to the HBA. The enclosure management controller IC also includes an input 320 for receiving an appropriate voltage for powering the operation of the IC (typically +5V DC), an input 322 for connecting to ground, inputs 238A-238B for receiving an appropriate clock signal, an input 324 for enabling a configuration of the IC, and a reset input 326 for resetting the operation of the IC. Additional details regarding the operation of the enclosure management controller IC are provided below with respect to FIGS. 4-6.

Figure 4:
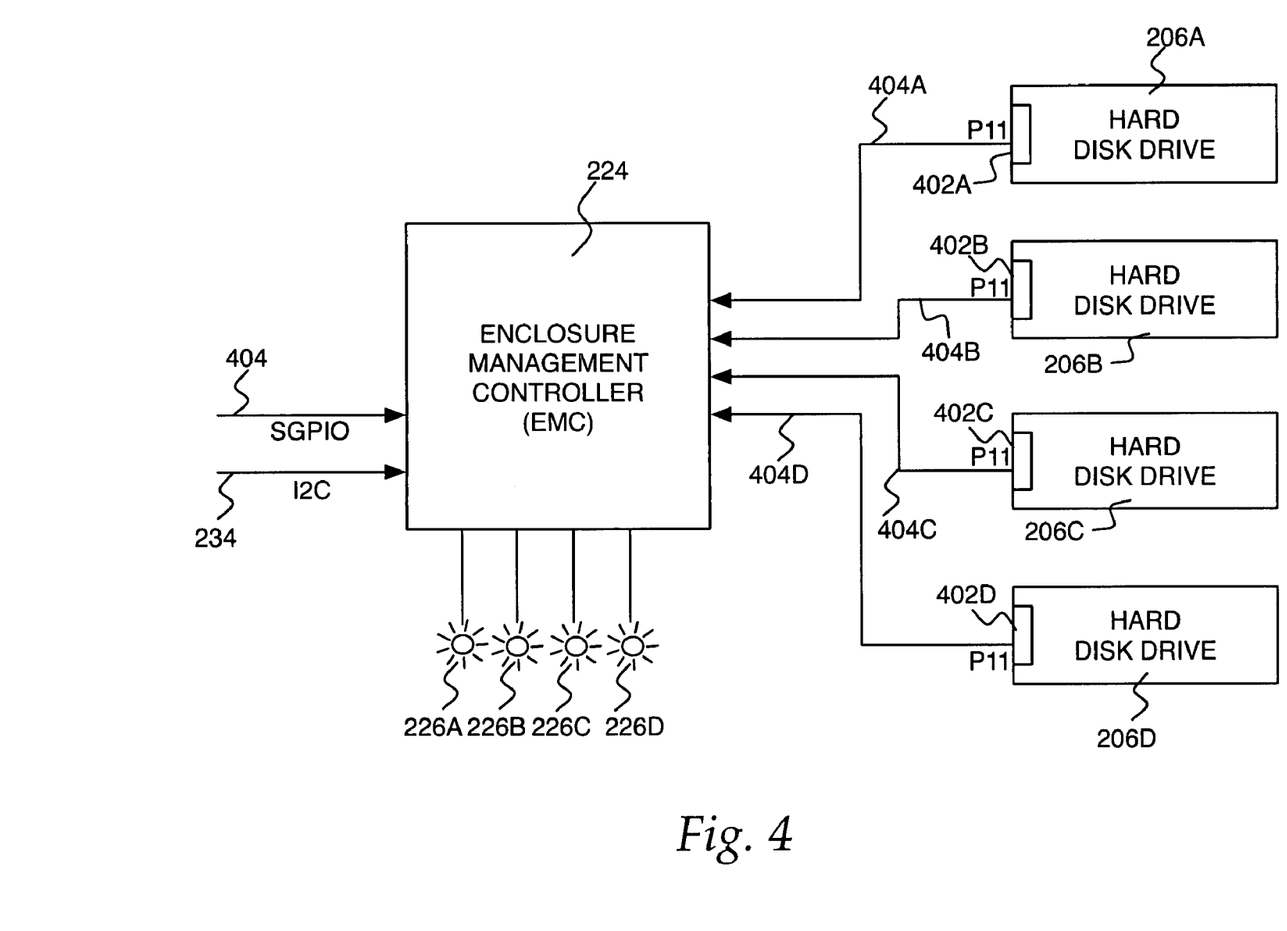
FIG. 4 is a functional block diagram illustrating additional aspects of an enclosure management controller semiconductor integrated circuit provided herein.

Referring now to FIG. 4, additional details will be provided regarding an implementation wherein the enclosure management IC 224 is operative to generate an activity indicator for connected mass storage devices. In this implementation, the enclosure management IC 224 is operative to receive enclosure management data on either the SCPIO interface 404 or the I²C interface 234. As described briefly above, the enclosure management data may be formatted according to the SGPIO, SAF-TE, or SAS-2 protocols and may include data indicating the activity of an attached mass storage device. The enclosure management controller IC 224 can detect the management protocol utilized and decode the enclosure management data, including the data indicating that a connected mass storage device is active.

As shown in FIG. 4, the drive activity signal from each of the hard disk drives 206A-206D are connected to inputs on the enclosure management controller IC 224. In an embodiment, the drive activity signal comprises pin P11 on the drive connector for both SAS and SATA drives. These pins are connected to the IC 224 via connections 404A-404D on the backplane 204. The IC 224 also includes outputs for driving an activity indicator, such as the LEDs 226A-226D. As will be described in greater detail below, the enclosure management IC 224 is operative to analyze the received enclosure management data and the drive activity signals provided by the connected mass storage devices to provide the drive activity indicator.

Figure 5:
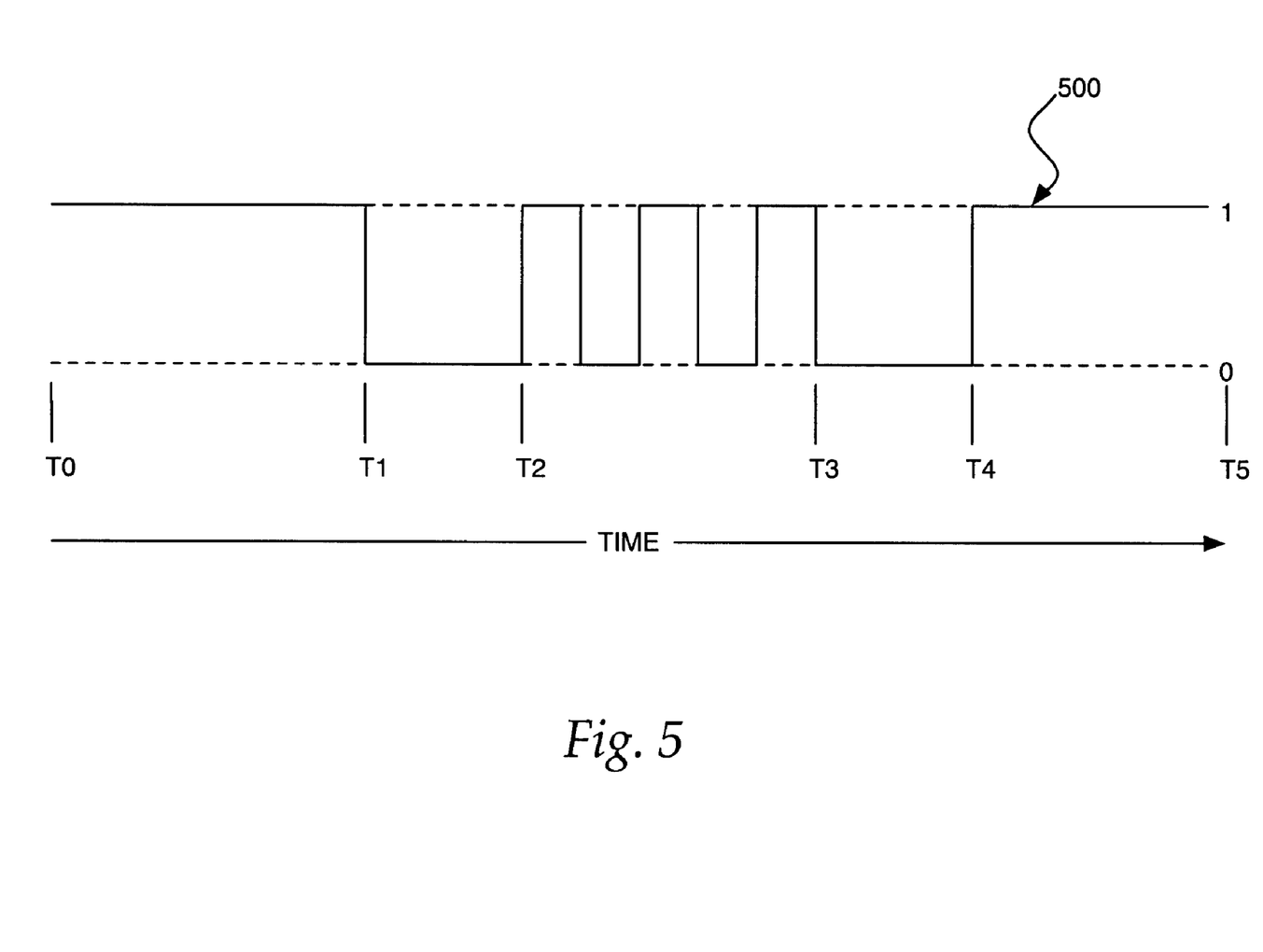
FIG. 5 is a signal timing diagram illustrating aspects of an activity signal provided by a mass storage device.

Turning now to FIG. 5, additional details regarding a drive activity signal provided by a mass storage device in one implementation will be described. In particular, FIG. 5 shows a signal waveform 500 provided on pin P11 of a SAS-compatible mass storage device. As illustrated in FIG. 5, the activity signal provided on pin P11 by a SAS-compatible mass storage device is high when the device is not connected to a HBA and goes low when the drive is identified by the controller. Accordingly, the waveform 500 is high from time T0 to time T1. At time T1, the device is identified and the waveform 500 goes low. The device is inactive between time T1 and T2.

When the mass storage device is active, the signal on pin P11 is toggled from a low state to a high state and back again. As shown in FIG. 5, the waveform 500 is toggling between a high and a low state between time periods T2 and T3 indicating that the device is active during these time periods. At time T3 the device becomes inactive and at time T4, the device is removed from the controller. As will be described in greater detail below, the enclosure management IC 224 is operative to distinguish periods of activity from periods of inactivity in the activity signal provided by the mass storage device. It should be appreciated that although a sample waveform signal for a SAS-compatible device has been illustrated in FIG. 5, the waveform for a SATA device is very similar. The waveform for a SATA device only differs in that the signal is high when the device is connected and ready but inactive.

Figure 6:
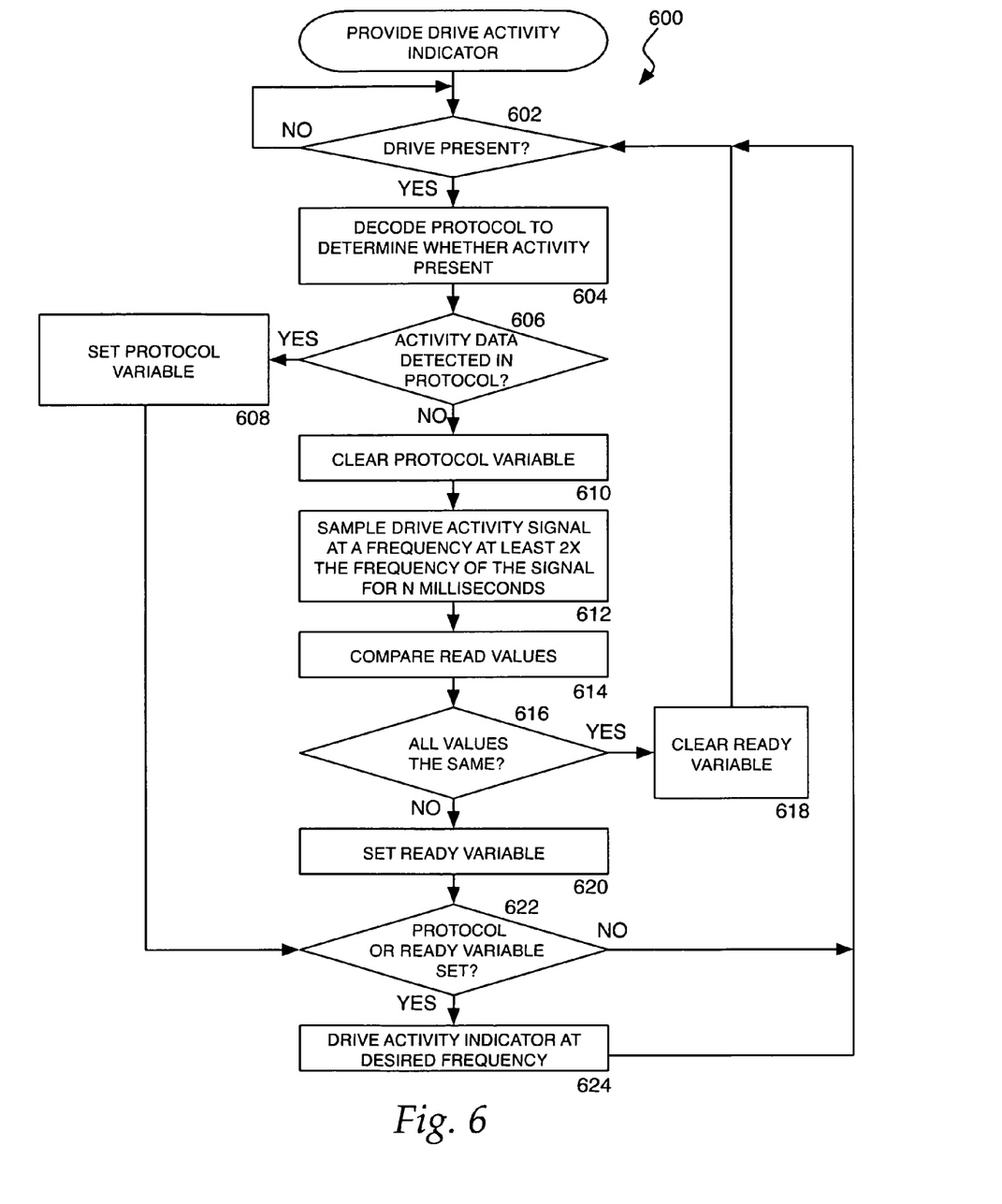
FIG. 6 is a flow diagram illustrating aspects of a process for providing an activity indicator in one implementation described herein.

Referring now to FIG. 6, additional details regarding the operation of the enclosure management controller IC 224 for providing an activity indicator for a mass storage device will be provided. In particular, a routine 600 will be described illustrating operations performed by the IC 224 for providing the activity indicator. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIG. 6 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where a determination is made as to whether a mass storage device is present. If no mass storage device is present, there is no need to display an activity indicator. Accordingly, if no mass storage device is present, the routine 600 returns back to operation 602 for another determination. If a device is present, the routing 600 continues to operation 604.

At operation 604, the enclosure management IC 224 decodes the enclosure management data received from the HBA for the connected device to determine whether the data indicates that the mass storage device is active. The routine 600 then continues to operation 606, where a determination is made as to whether activity data was detected in the received enclosure management data for the device. If activity was detected, the routine 600 branches to operation 608, where a protocol variable is set indicating that the protocol indicated drive activity. The variable may be a Boolean variable with a value of one indicating activity and a value of zero indicating no activity.

If, at operation 606, the enclosure management IC 224 determines that the protocol did not indicate that the device is active, the routine 600 continues to operation 610, where the protocol variable is reset (set to zero), thereby indicating that the protocol did not indicate drive activity. From operation 610, the routine 600 continues to operation 612, where the enclosure management IC 224 samples the drive activity signal received from the connected device. According to an embodiment, the drive activity signal is sampled at a frequency of at least two times the frequency of the drive activity signal. The sampled data may then be stored in an array. For instance, the drive activity signal may be sampled every 10 ms for 100 ms and the sampled values stored in an array of size ten.

From operation 612, the routine 600 continues to operation 614, where the stored sampled values are compared to one another to determine if any of the values changed. If all of the sampled values are the same, then no toggling of the drive activity signal occurred during the sampling time period. If any of the values changed, then the drive activity signal was toggled during the time period. Accordingly, at decision operation 616, the routine 600 continues to operation 620 if any of the values changed. At operation 620, a ready variable is set indicating that activity was detected on the drive activity signal. The ready variable may also comprise a Boolean variable being set to one when activity is detected and zero when no activity is detected. If, at operation 616, it is determined that none of the sampled values changed, then the routine 600 branches to operation 618 where the ready variable is reset (set to zero). From operation 618, the routine 600 returns to operation 602, described above.

From operation 620, the routine 600 continues to operation 622, where a determination is made as to whether activity was detected in the enclosure management protocol or the drive activity signal. In particular, if either the ready variable or the protocol variable is set to one, then activity was detected. Accordingly, if activity was detected, the routine 600 branches to operation 624, where the activity indicator is driven at a desired frequency. For instance, one of the LEDs 226A-226D may be driven at 8 Hz to indicate that the device is active. If no activity is detected, the routine 600 branches from operation 622 to operation 602, described above.

According to another implementation, the sampled values for a time period are added together to determine whether activity was indicated on the drive activity signal. Each of the sampled values are added together. At the end of the sample period, a determination is made as to whether the sum of the sampled values is equal to zero (thereby indicating that the signal was low during the entire sample period and not toggled) or whether the sum is equal to the number of samples taken (thereby indicating that the signal was high at the time of each sample and not toggling). If the sum of the sampled values is zero or equal to the number of samples taken, then no activity occurred on the drive activity signal during the time period. This procedure may be utilized instead of the process described at operations 614-620 of FIG. 6.

It will be appreciated that embodiments of the present invention provide an activity indicator for a mass storage device. Although the invention has been described in language specific to computer structural features, methodological acts and by computer readable media, and implementations utilizing a semiconductor integrated circuit, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for providing an activity indicator for a mass storage device, the computer-implemented method comprising computer-implemented operations for:

receiving enclosure management data from a host bus adapter;

decoding the enclosure management data to determine whether the enclosure management data indicates that the mass storage device is active;

determining whether the decoded enclosure management data indicates that the mass storage device is active;

in response to determining that the decoded enclosure management data indicates that the mass storage device is active, setting a protocol variable to indicate that the decoded enclosure management data indicates that the mass storage device is active;

in response to determining that the decoded enclosure management data does not indicate that the mass storage device is active, resetting the protocol variable to indicate that the decoded enclosure management data does not indicate that the mass storage device is active;

upon resetting the protocol variable, receiving a drive activity signal from the mass storage device;

determining from the drive activity signal whether the mass storage device is active by sampling the drive activity signal to determine whether the drive activity signal is toggled between a first state indicating that the mass storage device is not connected and a second state indicating that the mass storage device is identified, the drive activity signal being active if the drive activity signal is toggled;

in response to determining that the drive activity signal indicates that the mass storage device is active, setting a ready variable to indicate that the drive activity signal indicates that the mass storage device is active;

in response to determining that the drive activity signal does not indicate that the mass storage device is active, resetting the ready variable to indicate that the drive activity signal does not indicate that the mass storage device is active;

determining whether the protocol variable is set to indicate that the decoded enclosure management data indicates that the mass storage device is active;

in response to determining that the protocol variable is set to indicate that the decoded enclosure management data indicates that the mass storage device is active, providing the activity indicator;

in response to determining that the protocol variable is not set to indicate that the decoded enclosure management data indicates that the mass storage device is active, determining whether the ready variable is set to indicate that the drive activity signal indicates that the mass storage device is active; and in response to determining that the ready variable is set to indicate that the drive activity signal indicates that the mass storage device is active, providing the activity indicator.

2. The method of claim 1, wherein sampling the drive activity signal to determine whether the drive activity signal is being toggled comprises:

sampling the value of the drive activity signal at a rate of at least two times the frequency of the drive activity signal;

adding each of the sampled values during a time period;

determining whether the sum of the sampled values is equal to zero or the number of samples taken during the time period; and in response to determining that the sum of the sample values is zero or the number of samples taken during the time period, determining that the drive activity signal is not being toggled.

3. The method of claim 2, wherein the enclosure management data is formatted according to the SAF-TE protocol, the SGPIO protocol, or the SES-2 protocol.

4. The method of claim 1, wherein sampling the drive activity signal to determine whether the drive activity signal is being toggled comprises:

sampling the value of the drive activity signal at a rate of at least two times the frequency of the drive activity signal;

comparing each of the sampled values during a predefined time period to determine whether any of the values have changed; and in response to determining that one or more of the values have changed, determining that the drive activity signal is being toggled.

5. The method of claim 4, wherein the enclosure management data is formatted according to the SAF-TE protocol, the SGPIO protocol, or the SES-2 protocol.

6. The method of claim 5, wherein providing the activity indicator comprises illuminating a visual indicator corresponding to the mass storage device at a specified frequency.

7. An integrated circuit for performing the method of claim 1.

8. A computer-readable storage medium having computer-readable instructions stored thereon which, when executed, cause a computer to perform the method of claim 1.

9. A computer-controlled apparatus capable of performing the method of claim 1.

10. An integrated circuit for providing an activity indicator for a mass storage device, the integrated circuit comprising:

a first input for receiving enclosure management data from a host bus adapter;

a second input for receiving a drive activity signal from a mass storage device, wherein the drive activity signal received on the second input is toggled when the mass storage device is active, and wherein determining from the drive activity signal received on the second input whether the mass storage device is active comprises determining whether the drive activity signal is being toggled;

a first output for generating an indication that the mass storage device is active; and a processing portion operative to (a) decode the enclosure management data to determine whether the enclosure management data indicates that the mass storage device is active, (b) determining whether the decoded enclosure management data indicates that the mass storage device is active, (c) in response to determining that the decoded enclosure management data indicates that the mass storage device is active set a protocol variable to indicate that the decoded enclosure management data indicates that the mass storage device is active, (d) in response to determining that the decoded enclosure management data does not indicate that the mass storage device is active reset the protocol variable to indicate that the decoded enclosure management data does not indicate that the mass storage device is active, (e) upon resetting the protocol variable receive a drive activity signal from the mass storage device, (f) determine from the drive activity signal whether the mass storage device is active by sampling the drive activity signal to determine whether the drive activity signal is toggled between a first state indicating that the mass storage device is not connected and a second state indicating that the mass storage device is identified, the drive activity signal being active if the drive activity signal is toggled, (g) in response to determining that the drive activity signal indicates that the mass storage device is active, set a ready variable to indicate that the drive activity signal indicates that the mass storage device is active, (h) in response to determining that the drive activity signal does not indicate that the mass storage device is active, reset the ready variable to indicate that the drive activity signal does not indicate that the mass storage device is active, (i) determine whether the protocol variable is set to indicate that the decoded enclosure management data indicates that the mass storage device is active, (j) in response to determining that the protocol variable is set to indicate that the decoded enclosure management data indicates that the mass storage device is active, provide the activity indicator, (k) in response to determining that the protocol variable is not set to indicate that the decoded enclosure management data indicates that the mass storage device is active, determine whether the ready variable is set to indicate that the drive activity signal indicates that the mass storage device is active, and (l) in response to determining that the ready variable is set to indicate that the drive activity signal indicates that the mass storage device is active, provide the activity indicator.

11. The integrated circuit of claim 10, wherein determining whether the drive activity signal is being toggled comprises:

sampling the value of the drive activity signal at a rate of at least two times the frequency of the drive activity signal;

adding each of the sampled values during a time period;

determining whether the sum of the sampled values is equal to zero or the number of samples taken during the time period;

and in response to determining that sum is zero or the number of samples taken during the time period, determining that the drive activity signal is not being toggled.

12. The integrated circuit of claim 10, wherein determining whether the drive activity signal is being toggled comprises:

sampling the value of the drive activity signal at a rate of at least two times the frequency of the drive activity signal;

comparing each of the sampled values during a predefined time period to determine whether any of the values have changed; and in response to determining that one or more of the values have changed, determining that the drive activity signal is being toggled.

13. The integrated circuit of claim 10, wherein the first input is operative to receive the enclosure management data from the host bus adapter formatted according to either the SAF-TE protocol, the SGPIO protocol, or the SES-2 protocol.

14. A computer-implemented method for providing an activity indicator for a mass storage device, the computer-implemented method comprising computer-implemented operations for:

receiving enclosure management data from a host bus adapter;

decoding the enclosure management data to determine whether the enclosure management data indicates that the mass storage device is active;

determining whether the decoded enclosure management data indicates that the mass storage device is active;

in response to determining that the decoded enclosure management data indicates that the mass storage device is active, setting a protocol variable to indicate that the decoded enclosure management data indicates that the mass storage device is active;

in response to determining that the decoded enclosure management data does not indicate that the mass storage device is active, resetting the protocol variable to indicate that the decoded enclosure management data does not indicate that the mass storage device is active;

upon resetting the protocol variable, sampling a drive activity signal from the mass storage device at a frequency at least two times the frequency of the drive activity signal to determine whether the mass storage device is active, the mass storage device being active if the drive activity signal is toggled;

in response to determining that the drive activity signal indicates that the mass storage device is active, setting a ready variable to indicate that the drive activity signal indicates that the mass storage device is active;

in response to determining that the drive activity signal does not indicate that the mass storage device is active, resetting the ready variable to indicate that the drive activity signal does not indicate that the mass storage device is active;

determining whether the protocol variable is set to indicate that the decoded enclosure management data indicates that the mass storage device is active;

in response to determining that the protocol variable is set to indicate that the decoded enclosure management data indicates that the mass storage device is active, driving a light emitting diode corresponding to the mass storage device at a specified frequency;

in response to determining that the protocol variable is not set to indicate that the decoded enclosure management data indicates that the mass storage device is active, determining whether the ready variable is set to indicate that the drive activity signal indicates that the mass storage device is active; and in response to determining that the ready variable is set to indicate that the drive activity signal indicates that the mass storage device is active, driving the light emitting diode corresponding to the mass storage device at the specified frequency.

15. The method of claim 14, wherein sampling a drive activity signal from the mass storage device at a frequency at least two times the frequency of the drive activity signal to determine whether the mass storage device is active comprises:

sampling the value of the drive activity signal at a rate of at least two times the frequency of the drive activity signal;

adding each of the sampled values during a time period;

determining whether the sum of the sampled values is equal to zero or the number of samples during the time period;

and in response to determining that sum is zero or the number of samples taken during the time period, determining that the drive activity signal is not being toggled.

16. The method of claim 14, wherein sampling a drive activity signal from the mass storage device at a frequency at least two times the frequency of the drive activity signal to determine whether the mass storage device is active comprises:

sampling the value of the drive activity signal at a rate of at least two times the frequency of the drive activity signal;

comparing each of the sampled values during a predefined time period to determine whether any of the values have changed; and in response to determining that one or more of the values have changed, determining that the drive activity signal is being toggled.

17. A computer-readable storage medium having computer-readable instructions stored thereon which, when executed, cause a computer to perform the method of claim 14.

18. A computer-controlled apparatus capable of performing the method of claim 14.

* * * * *